(12) United States Patent
Banga et al.

(10) Patent No.: US 6,895,429 B2
(45) Date of Patent: May 17, 2005

(54) TECHNIQUE FOR ENABLING MULTIPLE VIRTUAL FILERS ON A SINGLE FILER TO PARTICIPATE IN MULTIPLE ADDRESS SPACES WITH OVERLAPPING NETWORK ADDRESSES

(75) Inventors: Gaurav Banga, Sunnyvale, CA (US); Mark Smith, Cupertino, CA (US); Mark Muhlestein, Tuscon, AZ (US)

(73) Assignee: Network Appliance, Inc., Sunnyvale, CA (US)

( * ) Notice: Subject to any disclaimer, the term of this patent is extended or adjusted under 35 U.S.C. 154(b) by 439 days.

(21) Appl. No.: 10/035,666

(22) Filed: Dec. 28, 2001

(65) Prior Publication Data

US 2003/0135578 A1 Jul. 17, 2003

(51) Int. Cl.[7] ............................................ G06F 15/167
(52) U.S. Cl. ..................... 709/215; 711/212; 711/213; 711/214; 711/216; 711/217; 711/218
(58) Field of Search ................................ 709/212–218, 709/220

(56) References Cited

U.S. PATENT DOCUMENTS

| | | | |
|---|---|---|---|
| 5,163,131 A | | 11/1992 | Row et al. |
| 5,355,453 A | | 10/1994 | Row et al. |
| 5,432,907 A | * | 7/1995 | Picazo et al. ............... 709/249 |
| 5,485,579 A | | 1/1996 | Hitz et al. |
| 5,802,366 A | * | 9/1998 | Row et al. ................... 709/250 |
| 5,819,292 A | | 10/1998 | Hitz et al. |
| 5,835,720 A | * | 11/1998 | Nelson et al. ............... 709/224 |
| 5,931,918 A | | 8/1999 | Row et al. |
| 5,941,972 A | | 8/1999 | Hoese et al. |
| 5,963,962 A | | 10/1999 | Hitz et al. |
| 6,038,570 A | | 3/2000 | Hitz et al. |
| 6,065,037 A | | 5/2000 | Hitz et al. |
| 6,167,446 A | * | 12/2000 | Lister et al. ................ 709/223 |
| 6,425,035 B2 | | 7/2002 | Hoese et al. |
| 2001/0011304 A1 | | 8/2001 | Wesinger, Jr. et al. |

OTHER PUBLICATIONS

U.S. Appl. No. 10/635,664, Muhlestein et al.
Rekhter, Y. and Moskowitz, B. and Kerrenberg, D. and De Groot, G.J. and Lear, E, Request for Comments:1918, Network Working Group, Feb. 1996.
U.S. Appl. No. 10/035,664, Muhlestein et al.
David Hitz et al. TR3002 File System Design for a NFS File Server Appliance published by Network Appliance, Inc.
Common Internet File System (CIFS) Version: CIFS–Spec 0.9, Storage Networking Industry Association (SNIA), Draft SNIA CIFS Documentation Work Group Work–in–Progress, Revision Date: Mar. 26, 2001.
Fielding et al. (1999) Request for Comments (RFC) 2616, HTTP/1.1.

(Continued)

Primary Examiner—T Nguyen
(74) Attorney, Agent, or Firm—Cesari and McKenna, LLP; A. Sidney Johnston

(57) ABSTRACT

A technique enables a server, such as a filer, configured with a plurality of virtual servers, such as virtual filers (vfilers), to participate in a plurality of private network address spaces having potentially overlapping network addresses. The technique also enables selection of an appropriate vfiler to service requests within a private address space in a manner that is secure and distinct from other private address spaces supported by the filer. An IPspace refers to each distinct address space in which the filer and its storage operating system participate. An IPspace identifier is applied to translation procedures that enable the selection of a correct vfiler for processing an incoming request and an appropriate routing table for processing an outgoing request.

43 Claims, 7 Drawing Sheets

OTHER PUBLICATIONS

European Search Report for European Patent Application No.: EP 02 25 8871.9, Filed: Dec. 23, 2002, all pages.

Glaude, David: "Virtual Server with Separate/Multiple Default Gateway/Routing" Mailing List 'LARTC1, 'Online1, Nov. 9, 2001, pp. 1–3, XP002256475, Retrieved from the Internet: Http://mailman.da9a.n1/pipermail/lartc/2001q4/001626.html, retrieved on Oct. 2, 2003.

IEEE–SA Standards Board: "Virtual Bridged Local Area Networks—IEEE STd, 802.1Q–1998", IEEE Standars for Local and Metropolitan Area Networks, Mar. 8, 1999, pp. 1–199, XP002256476, New York, NY, USA.

United States Patent Application Publication, Pub. No.: US 2001/0011304 A1, Pub. Date: Aug. 2, 2001, by Wesinger, Jr. et al., all pages.

* cited by examiner

TECHNIQUE FOR ENABLING MULTIPLE VIRTUAL FILERS ON A SINGLE FILER TO PARTICIPATE IN MULTIPLE ADDRESS SPACES WITH OVERLAPPING NETWORK ADDRESSES

FIELD OF THE INVENTION

The present invention relates to storage systems, such as filers, and, more specifically, to a filer having multiple virtual filers configured to participate in multiple private address spaces having potentially overlapping network addresses.

BACKGROUND OF THE INVENTION

A file server is a computer that provides file service relating to the organization of information on writeable persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access an application service executed by a server, such as a file server. In this model, the client may comprise an application executing on a computer that "connects" to the file server over a computer network, such as a point-to-point link, shared local area network, wide area network or virtual private network implemented over a public network, such as the Internet. Each client may request the services of the file system on the file server by issuing file system protocol messages (in the form of packets) to the server over the network. It should be noted, however, that the file server may alternatively be configured to operate as an assembly of storage devices that is directly-attached to a (e.g., client or "host") computer. Here, a user may request the services of the file system to access (i.e., read and/or write) data from/to the storage devices.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. A filer typically includes a large amount of storage (e.g., 6 terabytes) with the ability to support many (thousands) of users. This type of storage system is generally too large and expensive for many applications or "purposes". Even a typical minimum storage size of a volume (or file system) is approximately 150 gigabytes (GB), which is still generally too large for most purposes.

Rather than utilizing a single filer, a user may purchase a plurality of smaller servers, wherein each server is directed to accommodating a particular purpose of the user. However, the acquisition and (usually more importantly) maintenance of many smaller servers may be more costly than the purchase of a single filer. Therefore, it would be desirable to consolidate many servers within a single filer platform in a manner that logically embodies those servers. Server consolidation is thus defined as the ability to provide many logical or virtual servers within a single physical server platform. Some prior server consolidation solutions are configured to run multiple instances of a process, such as an application service. Other server consolidation solutions provide many independent servers that are essentially "racked together" within a single platform. Examples of virtual servers embodied within a single platform are web servers, database servers, mail servers and name servers.

Server consolidation is particularly useful in the case of a storage server provider (SSP). An SSP serves ("hosts") data storage applications for multiple users or clients within a single, physical platform or "data center". The data center is centrally maintained by the SSP to provide safe, reliable storage service to the clients. In a typical configuration, the data center may be coupled to a plurality of different client environments, each having an independent private internal network ("intranet"). Each intranet may be associated with a different client or division of a client and, thus, the data traffic must be separately maintained within the physical platform.

Request for Comments (RFC) 1918 defines portions of a 32-byte Internet protocol version 4 (IPv4) address space that may be used on any private intranet without requiring explicit authority from a third party, such as the Internet Assigned Numbers Authority (IANA). To communicate with an external host computer "outside" of a private intranet, e.g., over the Internet, an internal host computer on the private intranet sends a packet (request) having a destination IP address of the external host. The request further includes a source IP address that represents a private intranet IP address of the internal host. That private IP address may be translated to a globally agreed-upon IP address using a network address translation (NAT) device.

Specifically, the NAT device dynamically translates private intranet IP addresses (and transport port numbers) to non-private globally unique IP addresses (and port numbers) for all packets leaving and entering the private intranet. The NAT device uses a pool of globally unique IP addresses, which have been properly assigned by the IANA. Since it is expected that most data packet traffic will take place within the intranet, a small pool of such "global" addresses suffices to provide Internet connectivity to a large number of external hosts. This arrangement is generally necessary in most current networks because unassigned globally unique IP addresses are scarce and cannot be used for all hosts in a large network. A vast majority of computers currently connected to the Internet use NAT techniques to communicate with Internet servers.

Each client environment served by the SSP may correspond to a different virtual server (or sets of virtual servers) of the data center that performs storage operations using the client's unified view, i.e., "namespace", of network resources, such as an RFC 1918 compliant private IP address space. The private intranet of each environment is typically coupled to the Internet through an intermediate network device, such as a "firewall". Clients generally do not like to connect their storage resources (served by the data center) to their internal networks through firewalls, primarily because those devices adversely impact performance and restrict functionality. Therefore, the intranets are typically connected directly to the data center, bypassing the firewalls. A common arrangement for such an SSP configuration provides a dedicated network path (or paths) that begins at a client's RFC 1918 compliant intranet (where all IP addresses are private IP addresses) and ends at the data center. This allows each client to utilize IP addresses of its private address space when accessing the storage resources on the data center.

Although each private intranet guarantees unique IP addresses within its own private IP address namespace, there is no such guarantee across private namespaces. Since each client environment is directly connected to the SSP over its private intranet, the "hosting" data center may participate in several distinct client IP address spaces having IP addresses that overlap and, thus, conflict. Yet the data center is expected to service requests directed to these conflicting IP addresses, while maintaining the integrity and security of all data request traffic within each client's intranet and internal address space.

Moreover, the SSP must advertise its services and thus issue broadcast packets. Broadcast packets are also issued in the process of actually providing services, especially during the process of name resolution. In this case, the data center must ensure a broadcast packet generated in the context of one virtual server is only forwarded over the private intranet of the client associated with that server. In addition, a broadcast packet received over an intranet at the data center must be capable of identifying both the source and destination of that packet among the various virtual servers embodied within the data center platform.

SUMMARY OF THE INVENTION

The present invention comprises to a technique that enables a server, such as a filer, configured with a plurality of virtual servers, such as virtual filers (vfilers), to participate in a plurality of private network address spaces having potentially overlapping network addresses. To that end, the invention further enables selection of an appropriate vfiler to service requests within a private address space in a manner that is secure and distinct from other private address spaces supported by the filer. A vfiler is a logical partitioning of network and storage resources of the filer to establish an instance of a multiprotocol server. The network resources include network addresses, such as Internet protocol (IP) addresses, assigned to network interfaces.

As described herein, an IPspace refers to each distinct IP address space in which the filer and its storage operating system participate. Each vfiler is associated with an IP address space and, thus, belongs to one IPspace. The IPspace is preferably implemented on the "front end", i.e., the network interfaces, of the filer. In this context, the term network interface refers to an IP addressable interface. Each network interface is tagged with an IPspace identifier (ID) that binds the interface to an IPspace. Each interface has one or more IP addresses that are unique within the interface's IPspace. Moreover, an IPspace is further associated with a routing domain and the use of one or more routing tables. Each vfiler is provided with a routing table from its IPspace that controls routing operations for all requests processed by the vfiler.

According to an aspect of the invention, configuration information used to select an appropriate vfiler to service a request is stored in various data structures that cooperate to provide a statically assigned array or "database" of IPspace data structures. These data structures include, among others, an interface network (ifnet) structure associated with the network interfaces, an interface address (ifaddr) structure representing the IP address of an interface, a vfiler context data structure and process block (proc) data structure. The ifnet data structure includes configuration information such as a list of IP addresses assigned to the interface, pointers referencing ifaddr structures for those addresses and an IPspace ID of the interface. The ifaddr data structure includes a back link pointer that references a vfiler context associated with the IP address, whereas the vfiler context structure contains configuration information needed to establish an instance of a multiprotocol server. Each vfiler context is tagged with an IPspace ID and a pointer to one of the routing tables of the IPspace of the vfiler. The proc data structure represents the context of a process thread executing on the filer and contains a pointer referencing the current vfiler context.

In another aspect of the invention, the IPspace IDs are applied to translation procedures that enable the selection of a current vfiler for processing an incoming request and an appropriate routing table for processing an outgoing request. Logic of the network interface receiving the incoming request uses a destination IP address of that request along with the IPspace ID of the interface and other configuration information to select a current vfiler context for processing the request. If a routing operation is required for the outgoing request, the configuration information, including an IPspace ID associated with the current vfiler context, is used to select an appropriate routing table. The translation procedures are preferably employed on two critical paths of the vfiler: an incoming path of a request received at the vfiler and an outgoing path of a request issued by the vfiler.

Broadly stated, an incoming request received at a network interface of the filer is directed to the proper vfiler based on the destination IP address of the request and the IPspace ID of the interface. On the incoming path, the ifnet structure associated with the network interface is examined, searching the list of IP addresses for an IP address that matches the destination IP address. Upon finding a match, the pointer to the matching ifaddr structure is followed to obtain the back link pointer needed to locate the vfiler context data structure for the request. The correct vfiler context is then selected after comparing the IPspace ID stored in the ifnet structure with the IPspace ID of the vfiler context.

Thereafter, the vfiler context is set by configuring the pointer of the proc data structure to reference the current vfiler context. The correct vfiler context is set to qualify the request for subsequent processing in the filer, e.g., searches or boundary checks needed to verify that the vfiler is allowed to access requested storage resources. Notably, authentication information contained in each vfiler context prevents the request from being processed by users from other vfilers.

If the vfiler issues an outgoing request that does not require route calculation, a fast path technique described herein is invoked to increase performance. However, if a routing calculation is required, a lookup operation is performed to the routing table to determine over which output interface the request should be issued. On the outgoing path, the current vfiler context is used to choose the correct routing table; this is guaranteed to be a routing table of the vfiler's IPspace. The request is then forwarded to the output interface.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
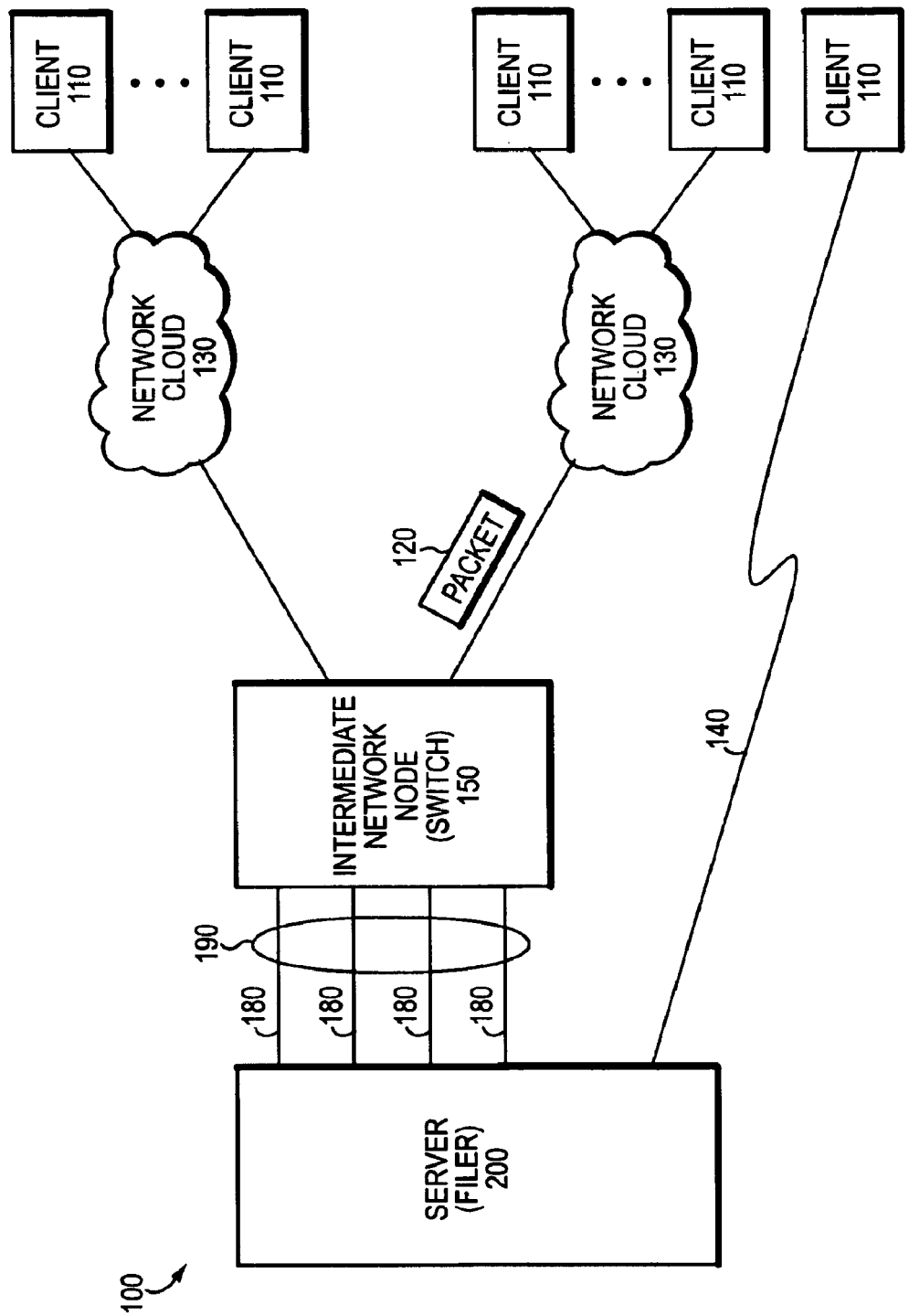
FIG. 1 is a schematic block diagram of a computer network including a plurality of clients and a server that may be advantageously used with the present invention.

FIG. 1 is a schematic block diagram of a computer network 100 including a plurality of clients 110 and a file server, such as a network storage appliance, that may be advantageously used with the present invention. The file server or filer 200 is a computer that provides file service relating to the organization of information on storage devices, such as disks. The clients 110 may be general-purpose computers configured to execute applications including file system protocols, such as the conventional Common Internet File System (CIFS) protocol. Moreover, the clients 110 may interact with the filer 200 in accordance with a client/server model of information delivery. That is, each client may request the services of the filer, and the filer may return the results of the services requested by the client, by exchanging packets 120 encapsulating, e.g., the CIFS protocol format over the network 100. It will be understood to those skilled in the art that the inventive technique described herein may apply to any server capable of providing a service to any client in accordance with various applications executing on the client.

The filer 200 may be coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as, e.g., local area networks (LANs) or virtual LANs (VLANs). Alternatively, the filer may be connected directly to one or more clients over a communications link 140 comprising a point-to-point connection or a shared medium, such as a LAN.

Figure 2:
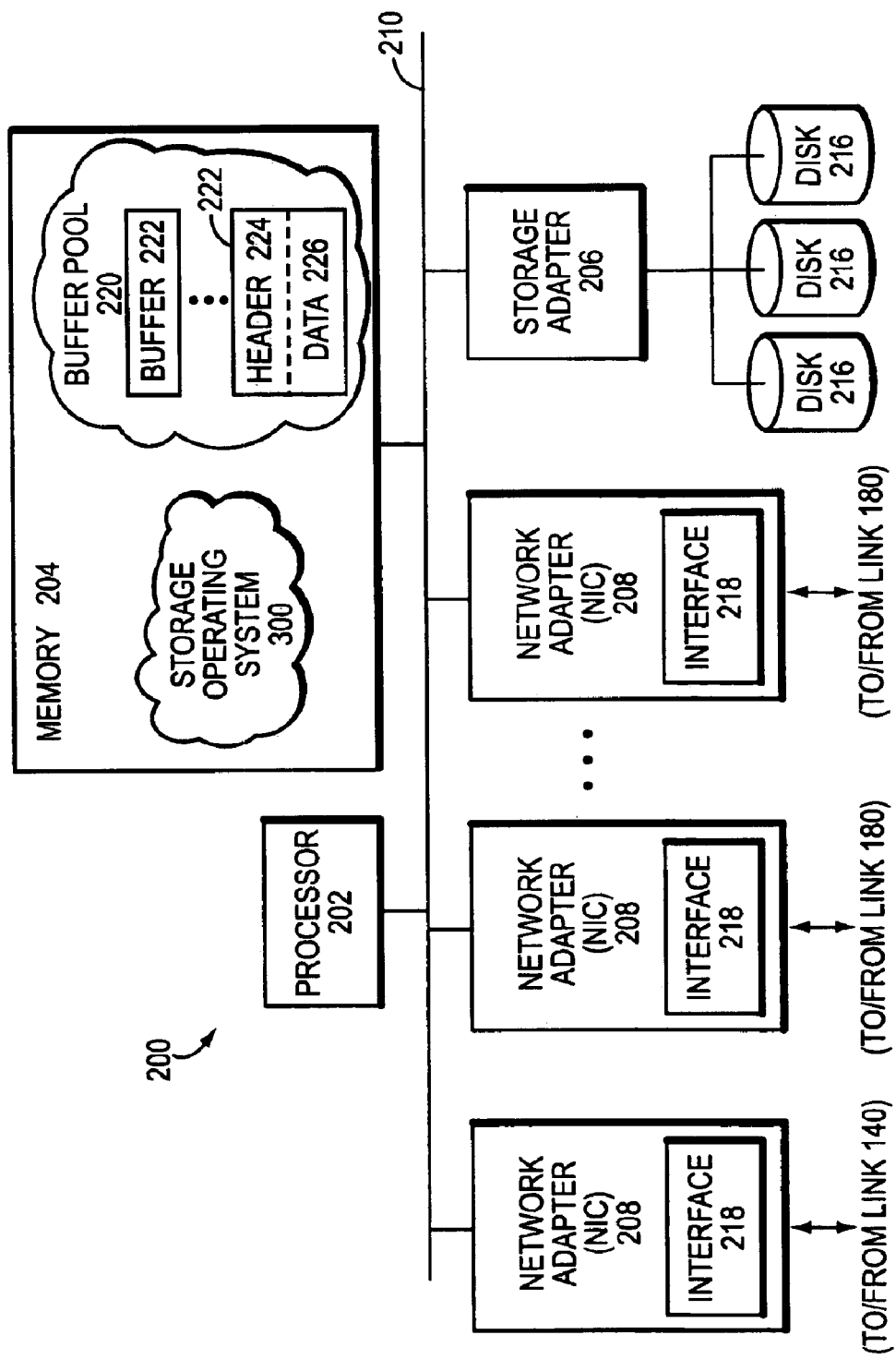
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and one or more network adapters 208 interconnected by a system bus 210, which is preferably a conventional peripheral computer interconnect (PCI) bus 210. The filer also includes a storage operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a buffer pool 220 organized as a plurality of data buffers 222 for use by network drivers of the operating system 300. Each network driver is assigned a list of buffers 222 that are used to load incoming data requests received at interfaces 218 of the network adapter 208, as described herein. Other sections of the memory may be organized as storage locations that are addressable by the processor and adapters for storing software program code and data structures, including routing tables, associated with the present invention. The processor and adapters may, in turn, comprise processing elements and/or logic circuitry configured to execute the software code and access the data structures. The storage operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

The network adapter 208 may comprise a network interface card (NIC) having the mechanical, electrical and signaling interface circuitry needed to connect the filer 200 directly to the communications link 140 or to the switch 150 over the physical links 180. In one embodiment, the physical links and interfaces may be organized as an aggregate or virtual interface (VIF) 190. Each NIC may include a single interface 218 such that, for a 4-link VIF, the filer includes 4 NICs 208. Alternatively, each NIC 208 may include 4 "quad port" interfaces 218, each of which is connected to a link 180 of the VIF 190. In another embodiment, the physical links and interfaces may be arranged as a de-aggregate or VLAN. Each interface 218 may be assigned one or more Internet Protocol (IP) addresses along with one media access control (MAC) address. However, when the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address.

The storage adapter 206 cooperates with the storage operating system 300 executing on the filer to access information requested by the client, which information may be stored on any writeable media, such as the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

Storage of information on the filer is preferably implemented as one or more storage "volumes" that comprise a cluster of physical storage disks 216, defining an overall logical arrangement of disk space. Each volume is generally associated with its own file system. To facilitate access to the disks 216, the storage operating system 300 implements a file system that logically organizes the information as a hierarchical structure of a s directories and files on the disks. Each "on-disk" file may be implemented as set of disk blocks configured to store information, such as data, whereas the directory may be implemented as a specially formatted file in which information about other files and directories are stored. As noted, the storage operating system is preferably the Data ONTAP operating system that implements a WAFL file system. However, it is expressly contemplated that any appropriate file system can be used, and as such, where the term "WAFL" is employed, it should be taken broadly to refer to any file system that is otherwise adaptable to the teachings of this invention.

Figure 3:
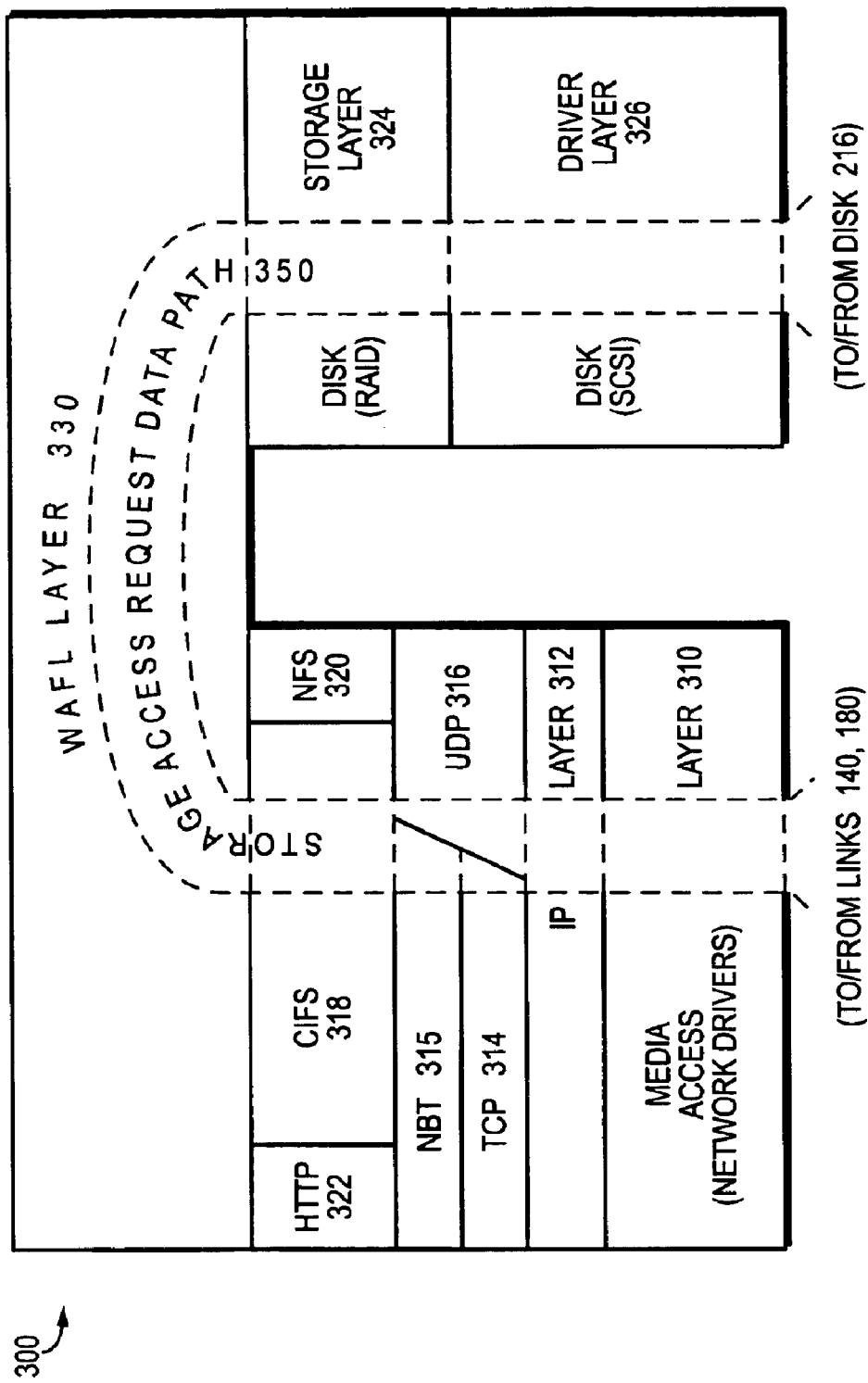
FIG. 3 is a schematic block diagram of a storage operating system that may be advantageously used with the present invention.

FIG. 3 is a schematic block diagram of the Data ONTAP operating system 300 that may be advantageously used with the present invention. The storage operating system comprises a series of software layers, including a media access layer 310 of network drivers (e.g., a gigabit Ethernet driver). The operating system further includes network protocol layers, such as the IP layer 312 and its supporting transport mechanisms, the Transport Control Protocol (TCP) layer 314 and the User Datagram Protocol (UDP) layer 316. A file system protocol layer provides multi-protocol data access and, to that end, includes support for the CIFS protocol 318, the Network File System (NFS) protocol 320 and the Hypertext Transfer Protocol (HTTP) protocol 322. The storage operating system 300 also includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol.

Bridging the disk software layers with the network and file system protocol layers is a WAFL layer 330 that preferably implements the WAFL file system. The on-disk format representation of the WAFL file system is block-based using, e.g., 4 kilobyte (B) blocks and using inodes to describe the files. An inode is a data structure, e.g., a 128-byte structure, which is used to store information, such as meta-data, about a file. The meta-data contained in an inode may include, e.g., ownership of the file, access permission for the file, size of the file, file type and location of the file on disk. The WAFL file system uses a file handle, i.e., an identifier that includes an inode number, to retrieve an inode from disk. The WAFL layer 330 also uses files to store meta-data describing the layout of its file system. These meta-data files include, among others, an inode file.

Operationally, a request from a client 110 is forwarded as, e.g., a conventional CIFS protocol packet 120 over the computer network 100 and onto a network adapter 208 of the filer 200. A network driver of the media access layer 310 cooperates with the network adapter to load the request packet into a data buffer 222 and marks the buffer with the name of the physical interface 218 over which the incoming request was received at the filer. Each buffer 222 includes a header 224 and a data portion 226, with the incoming packet being loaded into the data portion. The contents of the header are maintained by the filer and include (i) the type of buffer, (ii) various flags and (iii) the incoming interface marked by the filer. After being loaded with the incoming packet, the buffer 222 is essentially "pushed up" the network protocol stack and delivered to an appropriate application which services the requests by, e.g. fetching data stored on disks of the filer.

Specifically, the network driver 310 passes the buffer to the network protocol layers 312–314 and onto the CIFS layer 318 for additional processing prior to forwarding to the WAFL layer 330. The WAFL file system generates operations to load (retrieve) the requested data from disk 216 if it is not resident "in core", i.e., in the memory 204. If the information is not in memory, the WAFL layer 330 indexes into the inode file using the inode number to access an appropriate entry and retrieve a logical volume block number (VBN). The WAFL layer then passes the logical VBN to the disk storage (RAID) layer 324, which maps that logical number to a disk block number and sends the latter to an appropriate driver (e.g., SCSI) of the disk driver layer 326. The disk driver accesses the disk block number from disk 216 and loads the requested data block(s) in memory 204 for processing by the filer. Upon servicing the request, the CIFS layer 318 allocates another (response) buffer 222 from the buffer pool 220 for the fetched data and further associates that response to the initial request. That is, the CIFS layer 318 marks the response buffer with the physical interface associated with the incoming request.

As noted, the filer 200 is configured to provide file service to a plurality of clients 110 and, as a result, generally returns data responsive to requests issued by the clients. In order to enhance its responsiveness, the filer implements a "fast path" technique that essentially returns a response over the same physical interface 218 that was used to receive a request from the client. To invoke the fast path technique, the CIFS layer 318 asserts a fast path flag within the buffer header 224 and then passes the buffer "down" the protocol stack to the IP layer 312, which examines the state of that flag. Assertion of the fast path flag informs the IP layer that it does not have to perform route calculation for this particular response. Accordingly, the interface within the filer targeted to receive the response buffer is the incoming interface 218 over which the request was received. The buffer is forwarded to that interface and the requested data is then returned to the client 110 over the network 100.

It should be noted that the software "path" through the storage operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation may increase the performance of the file service provided by filer 200 in response to a file system request packet 120 issued by client 110. Moreover, in another alternate embodiment of the invention, the processing elements of adapters 206, 208 may be configured to offload some or all of the packet processing and storage access operations, respectively, from processor 202, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., server) or general-purpose computer, including a standalone computer or portion thereof, embodied as or including a storage system. A server may be defined as a computer adapted to provide application service to one or more clients; in this context, a virtual server is an instance of the application service provided to a client. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention relates to an architecture that provides the ability to create and maintain multiple instances of virtual servers, such as virtual filers (vfilers), within a single server, such as a filer. A vfiler is a logical partitioning of network and storage resources of the filer to establish an instance of a multi-protocol server. Each vfiler is maintained and executed entirely independent of other vfilers on the filer platform. To that end, dedicated filer resources, such as units of storage and network addresses of network interfaces may be arbitrarily grouped and "hard" partitioned to establish security domains within the filer platform. Yet common filer resources, such as storage devices and a storage operating system, may be shared among the vfilers. The vfiler architecture is disclosed in U.S. patent application Ser. No. 10/035,644 titled *Architecture for Creating and Maintaining Virtual Filers on a Filer*, which is hereby incorporated by reference as though filly set forth herein.

Figure 4:
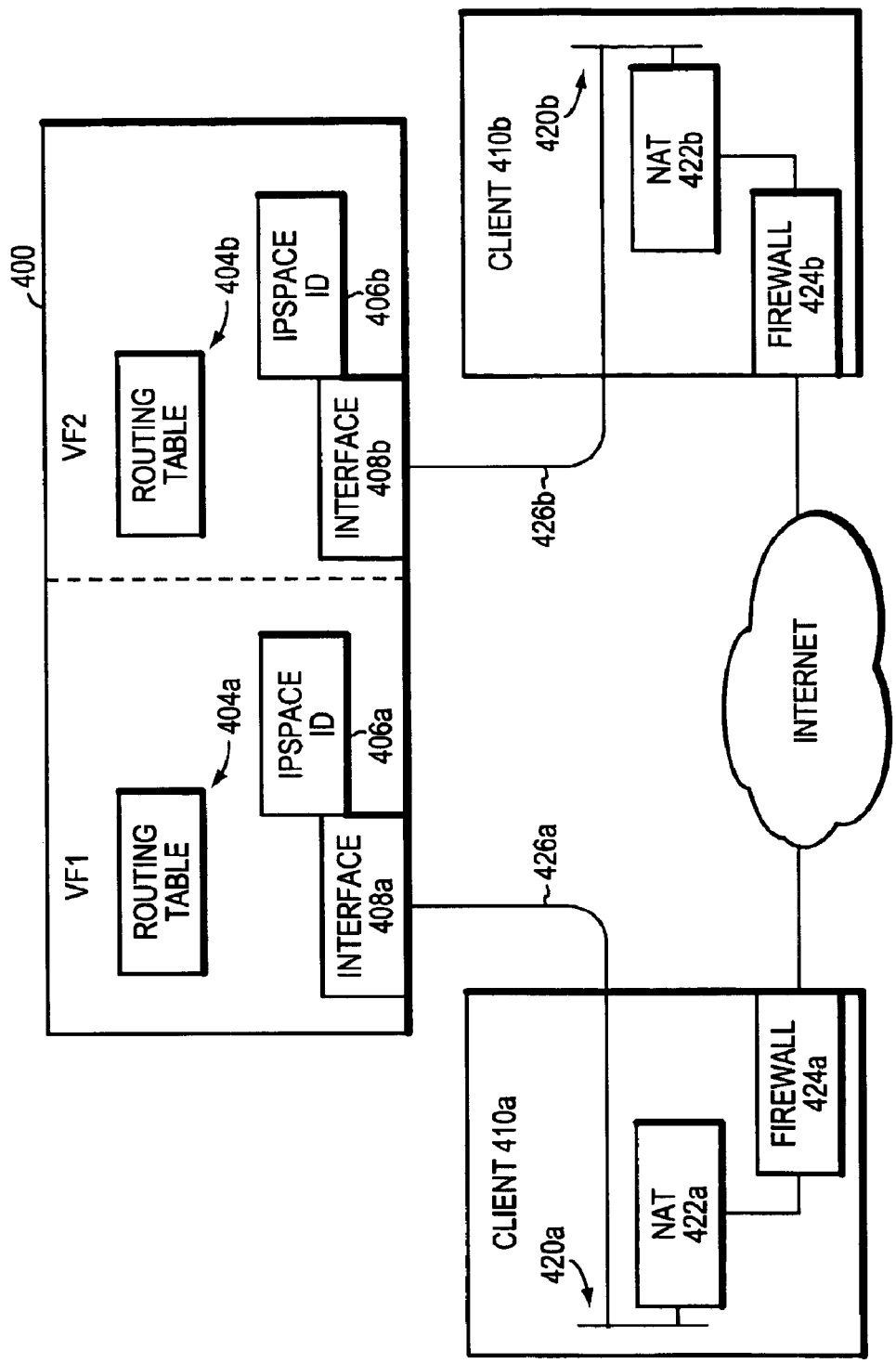
FIG. 4 is a schematic diagram of an embodiment of a filer that may be advantageously used with the present invention.

FIG. 4 is a schematic diagram of an embodiment of a filer 400 that may be advantageously used with the present invention. Here, the filer functions as a storage service provider (SSP) to serve ("host") data storage applications for multiple users or clients within the filer platform or "data center". The data center 400 is coupled to a plurality of different client environments 410a,b, each having an independent private internal network ("intranet" 420a,b). Each client environment 410 corresponds to a different vfiler of the data center that performs storage operations using the client's unified view, i.e., "namespace", of network resources, such as an RFC 1918 compliant private IP address space.

Specifically, the SSP data center is organized into two logical vfilers VF1 and VF2, where VF1 is associated with a first client environment 410a and VF2 is associated with a second client environment 410b. Each client's private intranet 420a,b is coupled to the Internet through a network address translation (NAT) device 422a,b and an intermediate network device, such as a "firewall" 424a,b, that controls traffic between the secure intranet and the "insecure" Internet. However, utilization of the firewall (and NAT) generally hinder performance; accordingly, each intranet 420a,b is connected directly to the SSP over a dedicated network path 426a,b that begins at the client's RFC 1918 compliant intranet and ends at the data center 400. This allows each client to utilize IP addresses of its private address space when accessing the storage resources on the data center.

Although each private intranet guarantees unique IP addresses within its own private IP address namespace, there is no such guarantee across private namespaces. Therefore, the "hosting" data center 400 may participate in several distinct client IP address spaces having IP addresses that overlap and conflict. Yet the data center is expected to service requests directed to these conflicting IP addresses, while maintaining the integrity and security of all data request traffic within each client's intranet and internal address space.

IPspace

The present invention is directed to a technique that enables a filer configured with a plurality of (multiple) vfilers to participate in multiple private network address spaces having potentially overlapping network addresses. The invention further enables selection of an appropriate vfiler to service requests within a private address space in a manner that is secure and distinct from other private address spaces supported by the filer. According to the invention, an IPspace refers to each distinct IP address space in which the filer and its storage operating system participate. Each vfiler is associated with an IP address space and, thus, belongs to one IPspace. Each interface of the filer is "tagged" with (assigned) an IPspace identifier (ID) that essentially "binds" the interface to an IPspace. The IP addresses of each vfiler (and within each IPspace) must be unique.

The filer preferably supports multiple IPspaces, each of which is implemented on the "front end", i.e., the network interfaces, of the filer. In this context, the term network interface refers to an IP addressable interface, including a "physical" NIC that can be assigned one or more IP addresses and a "soft" NIC, such as a VIF, a VLAN and an emulated LAN (ELAN). By default, there is only one IPspace—the default IP namespace. Every network interface that can be assigned an IP address initially belongs to this default IPspace. All addresses specified for a vfiler are bound to the IPspace associated with the vfiler. If no IPspace is specified, the default IPspace is assumed.

Referring to FIG. 4, each vfiler VF1, VF2 is configured with one or more network interfaces 408a,b that may be assigned one or more IP addresses. Each interface of the vfiler is assigned an IPspace identifier (ID) 406a,b. The IPspace ID assigned to an interface is contained within an IPspace database structure associated with the interface. Each vfiler VF1, VF2 also maintains one routing table 404a,b (i.e., one of the routing tables of its IPspace) that controls routing operations for all request traffic processed by that vfiler. An IPspace is further associated with a routing domain and the use of one or more routing tables. There can be one routing table per IPspace, allowing multiple vfilers to share a routing table. Any routing table can only refer to (and thus cause packets to be routed to) interfaces that belong to the IPspace of the routing table.

IPspace Database

Figure 5:
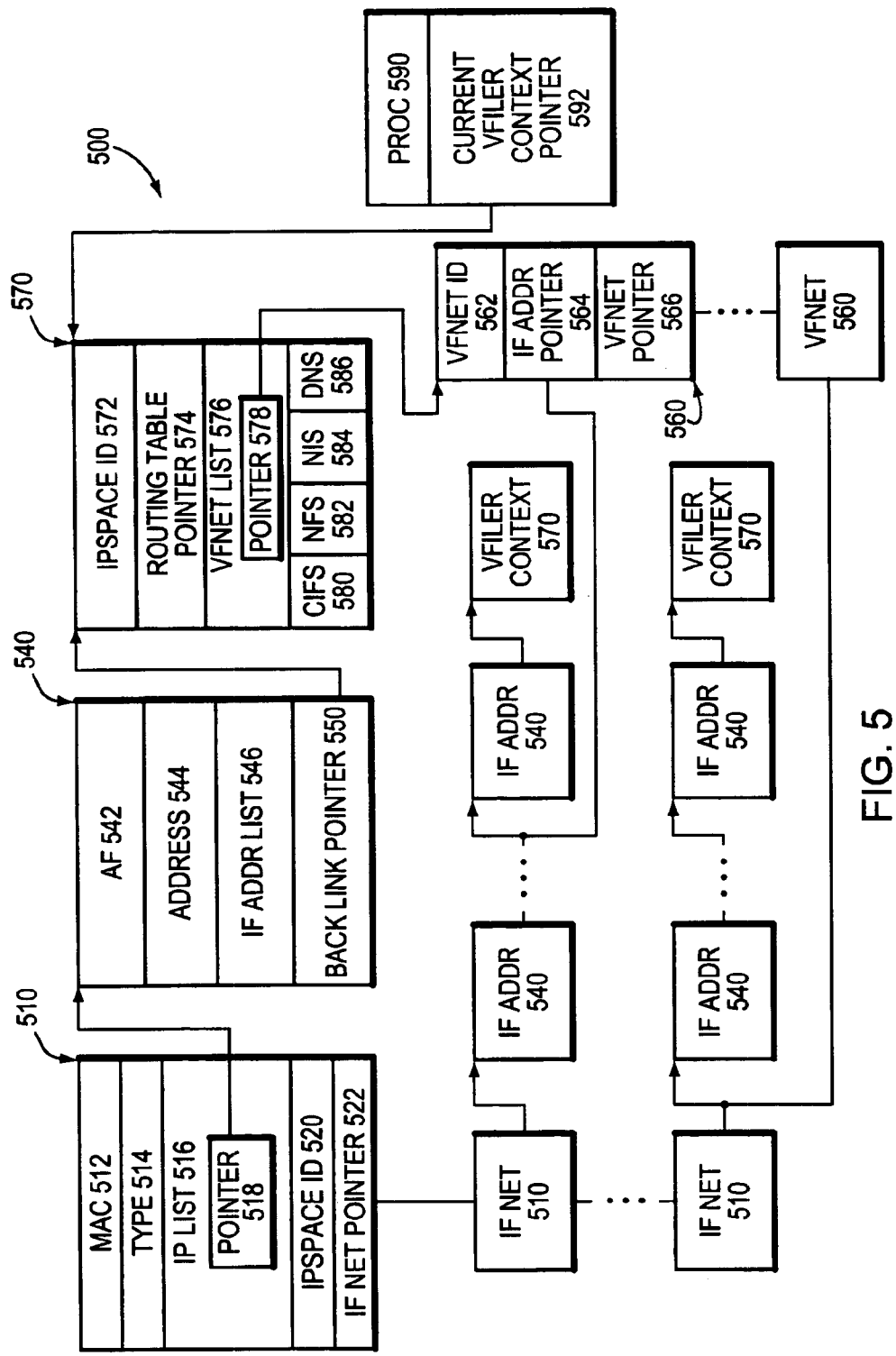
FIG. 5 is a schematic block diagram illustrating an IPspace database that may be advantageously used with the present invention.

According to an aspect of the invention, configuration information used to select an appropriate vfiler to service a request is stored in various data structures that cooperate to provide a statically assigned array or "database" of IPspace data structures in memory 204. FIG. 5 is a schematic block diagram illustrating IPspace database 500 that includes interface network (ifnet) data structures 510 associated with the network interfaces, interface address (ifaddr) data structures 540 representing the IP addresses of the interfaces, virtual filer network (vfnet) data structures 560 representing "dynamically adjustable" portions of capabilities of the interfaces, vfiler context data structures 570 and a process block (proc) data structure 590.

Each network interface is associated with an ifnet data structure 510 that contains configuration information describing the interface. For example, the structure 510 includes a MAC field 512 containing a MAC address of the interface and a type field 514 indicating the type of interface. An IP list field 516 contains a list of IP addresses assigned to the interface. The list includes pointers 518 that reference the appropriate ifaddr data structures 540 associated with those IP addresses. The ifnet structure also includes a field containing an IPspace ID 520 assigned to the interface. Another field contains ifnet pointers 522 referencing other ifnet structures. The ifnet data structure 510 provides an entry point to a driver of the media access layer 310 via a function call.

An ifnet structure may be associated with (i) one physical interface, (ii) an aggregate of physical interfaces, such as a VIF, or (iii) a de-aggregate of physical interfaces, such as a VLAN. A plurality of physical interfaces on one or more NICs may be aggregated and associated with one IP address. Aggregation of physical interfaces into one VIF is defined by IEEE 802.3ad. Only one ifnet data structure 510 is associated with the VIF. In contrast, deaggregation of data traffic over a single physical link into multiple different requests for multiple independent networks provide the basis of the VLAN technology. Here, one physical interface corresponds to multiple ifnet data structures. Each incoming packet is "tagged" with a VLAN ID that is used to associate the incoming request packet with an ifnet data structure. An ifnet data structure can have only one IPspace ID. That is, the ifnet structure cannot be shared among different IPspaces. Thus, an ifnet structure (or logical interface) can only belong to one IPspace.

Each ifaddr structure 540 stores information about the logical network addresses associated with a network interface. The ifaddr structure includes an af field 542 that identifies the address family or type of network address, e.g., an IP address, and an address field 544 containing the actual IP address associated with the structure. A field 546 contains a list of all other ifaddr data structures associated with the network interface. Each ifaddr data structure also includes a field containing a back link pointer 550 (e.g., an in core address) that references a vfiler context associated with the IP address; this ensures that each ifaddr data structure is associated with only one vfiler context. The back link pointer 550 is loaded into the ifaddr structure at vfiler configuration.

A vfiler is created by the following command line interface (CLI) command of a user interface associated with the operating system:

vfiler create[name][-s IPspace-name][-i IP address(s)] [path to storage]

The vfiler create command creates a vfiler context data structure 570 containing configuration information needed to establish an instance, i.e., the current vfiler, of a multi-protocol server. The configuration information of each vfiler context 570 includes, among other things, an IPspace ID 572 and a pointer 574 to the routing table for the IPspace of the vfiler.

A vfnet list 576 contains a list of vfnet structures (objects) that is assigned to the vfiler. The list includes pointers 578 that reference appropriate vfnet objects 560, each of which corresponds to an IP address. Each vfnet object 560 includes a field containing a vnet ID 562 used to locate the structure in the list 576 and a field containing vfnet pointers 566 referencing other vfnet objects. An ifaddr pointer field 564 holds a pointer that references an ifaddr structure 540, if the corresponding IP address is configured on that structure 540; otherwise, the pointer of field 564 is null.

Specifically, each vfnet object represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects and, thus, potentially different vfilers. If only a single IP address is associated with an ifnet structure, only one vfnet object 560, and therefore only one vfiler, uses the capabilities of the NIC.

In addition, the vfiler context 570 includes a plurality of "module" data structures that includes all information (such as global variables) needed for an instance of a particular protocol or subsystem. For example, a CIFS module data structure 580 contains all information needed for an instance of the CIFS protocol, including information about the domain controller, active sessions for the protocol and various control blocks associated with the CIFS protocol. There is a similar per-module data structure for each of the protocols and subsystems associated with a vfiler, such as the NFS protocol 582, network information system (NIS) subsystem 584 and domain name service (DNS) subsystem 586.

Internal to the storage operating system is the notion of a process or thread of control executing on the filer. The proc data structure 590 represents the context of that process thread executing on the filer. According to an aspect of the invention, the process block structure is enhanced to include the notion of a thread running in a current vfiler context that is executing on the filer. To that end, the proc data structure 590 includes a pointer 592 referencing the current vfiler context 570.

In sum, the key to indexing into the data structures of the IPspace database 500 is a combination of destination IP address and IPspace. The output of the database 500 provides (i) a vfiler context 570 as a result of, e.g., a valid incoming request, or (ii) a failure as a result of an invalid incoming request. This aspect of the inventive technique enable a filer to support the same IP address on two different interfaces as long as the interfaces are associated with different IPspaces.

Translation Procedures

In another aspect of the invention, the IPspace IDs are applied to translation procedures that enable the selection of a correct vfiler for processing an incoming request and an appropriate routing table for processing an outgoing request. Logic (i.e., networking code) of the network interface receiving the incoming request uses a destination IP address of that request along with the IPspace ID of the interface and other configuration information to select a correct vfiler for processing the request. If a routing operation is required for the outgoing request, the configuration information, including an IPspace ID associated with the current vfiler context, is used to select an appropriate routing table. The translation procedures are employed on two critical paths of the vfiler: an incoming path of a request received at the vfiler and an outgoing path of a request issued by the vfiler.

Figure 6:
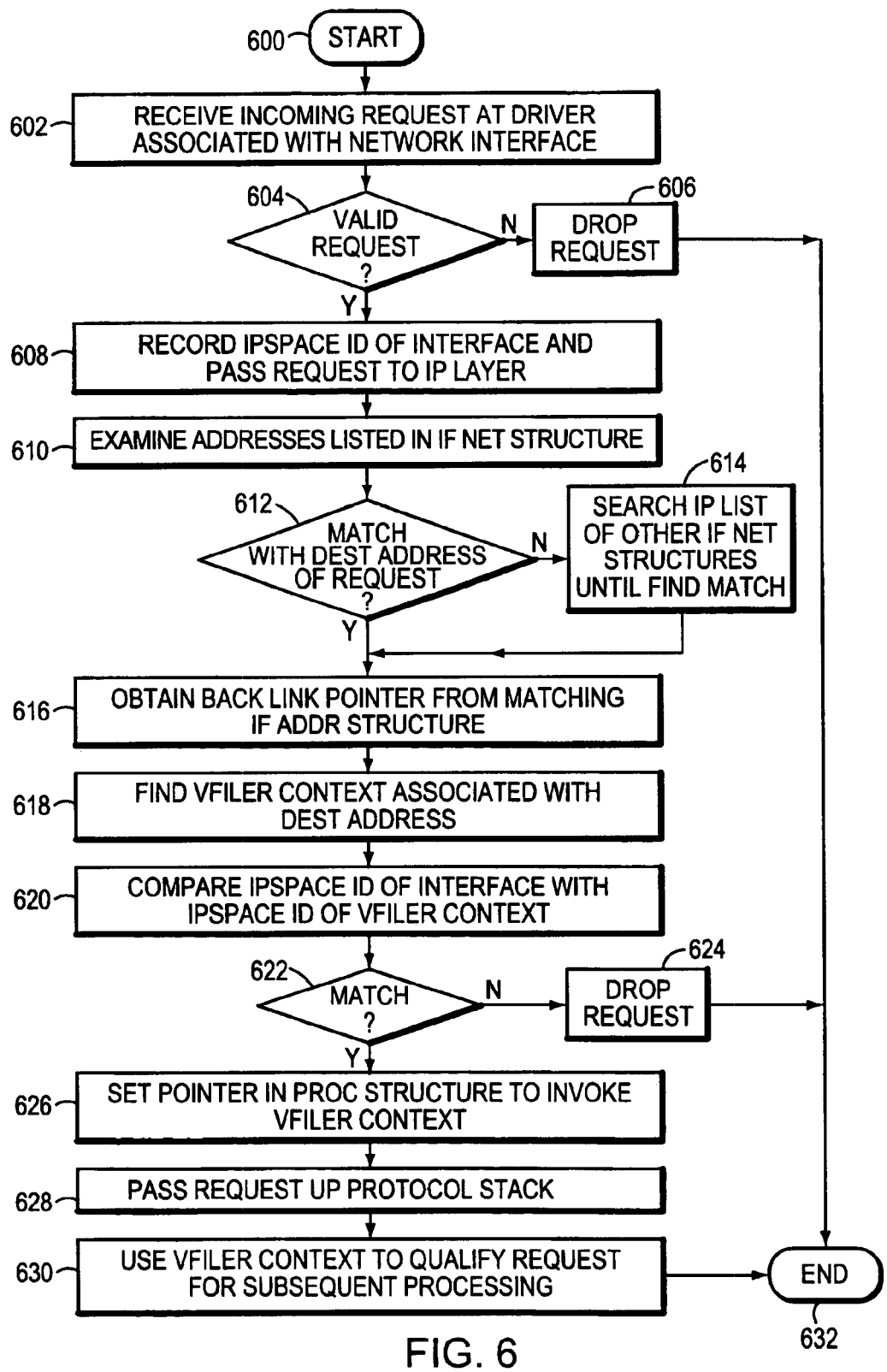
FIG. 6 is a flowchart illustrating the sequence of steps involved with an incoming path translation procedure in accordance with the present invention.

Incoming Path:

FIG. 6 is a flowchart illustrating the sequence of steps involved with an incoming path translation procedure that enables selection of a correct vfiler for an incoming request in accordance with the present invention. The sequence starts at Step 600 and proceeds to Step 602 where an incoming request (such as NFS, CIFS, HTTP or TelNet packet) is received at a network interface of the physical filer and is thereafter directed to the proper vfiler based on the destination IP address of the request and the IPspace ID of the interface. Specifically, in Step 604, networking code, such as an initialization process within the media access layer 310, determines whether the request is a valid IP packet (i.e., the source and destination IP addresses are correct). Note that there is a process (thread) for each interface and its associated driver. For example, the process associated with a gigabyte Ethernet (GBE) interface driver is a GBE thread. If the request is not valid, the request (packet) is dropped in Step 606 and the sequence ends in Step 632. If the request is valid, the GBE interface driver receiving the packet defines the IPspace "context", i.e., records the IPspace ID associated with the interface, for that request and passes the request to the IP layer 312 (Step 608).

The networking code then determines to which higher-level protocol (UDP, TCP) the request belongs. Here, the networking code includes an ipinput code portion residing within the IP layer 312 of the storage operating system 300 and is "called" by the network interface driver when it determines that the request is a valid IP packet. In particular, a determination is made as to within which vfiler context the request should be forwarded to that higher-level protocol. For this determination, it is necessary to determine the appropriate vfiler associated with the request.

To determine the correct vfiler for the request, the networking code accesses the ifnet structure 510 associated with the incoming network interface and examines its IP list 516 (Step 610). In Step 612, a determination is made as to whether there is a match between the IP addresses on the list and the destination IP address of the request. If there is no match, a pointer 522 that references another ifnet structure 510 is followed and its IP list searched until a matching destination IP address is found (Step 614). Upon finding a match, in Step 616 the pointer 518 to the matching ifaddr structure 540 is followed to obtain the back link pointer 550 needed to locate the correct vfiler context data structure 570 for the request. In some cases, however, there may be multiple ifaddr structures 540 with IP addresses matching the destination IP address of the incoming request. This is particularly the case for a filer functioning as a SSP wherein the private address spaces associated with the vfilers may have conflicting/overlapping IP addresses. As a result, the translation process associated with the incoming path must be further qualified using the IPspace ID of the interface on which the packet was received to identify the appropriate vfiler associated with the request, as described below.

Once the appropriate ifnet and iaddr structures are located, the networking code has enough information to find the vfiler context data structure associated with the destination IP address (Step 618). A comparison operation using the IPspace ID is then performed to determine the correct vfiler. In particular, the IPspace ID 520 stored in the appropriate ifnet data structure 510 is compared with the IPspace ID 572 stored in the vfiler context 570 (Step 620). If the selected destination IP address and the IPspace ID from the IPspace data structures do not match the destination IP address of the incoming request and the IPspace ID of the receiving interface (Step 622), the request is dropped in Step 624 and the sequence ends in Step 632. Otherwise, the request is processed by that vfiler. This effectively "sets" the vfiler context for subsequent processing of the request in the filer.

In particular, the IP layer networking code sets (invokes) the vfiler context by issuing a system call to set the pointer 592 of the proc data structure 590 for the GBE thread to reference the current vfiler context 570 (Step 626). The IP layer then passes the request to the transport layer (e.g., TCP) that, in turn, passes it to the multi-layer protocol access layer (e.g., CIFS) of the storage operating system. As the request is passed "up" the protocol stack layers (Step 628), the vfiler context is "carried" with the request. In Step 630, the correct vfiler context is invoked to qualify the request for subsequent processing, e.g., searches or boundary checks needed to verify that the vfiler is allowed to access requested storage resources.

For example, the IP layer code calls into the TCP layer code, which examines its protocol control block (PCB) tables to determine if there is a "socket" open for a port number included in the request. The port number is used to identify a particular protocol server, e.g., the CIFS layer protocol. The PCB tables are qualified by vfiler and IPspace ID to thereby enable the TCP layer 314 to determine whether the current vfiler has an open socket. If so, that TCP layer calls into a NetBIOS over TCP (NBT) layer (shown at 315 of FIG. 3) that performs framing for the CIFS protocol. Once the NBT layer 315 has a full request, it calls into the CIFS protocol layer 318 (again running in the GBE thread). All protocol and software code running in the GBE process use the current vfiler's context to find the per vfiler data structure. Therefore when CIFS code executes, it runs in the context of the current vfiler context 570 and, in particular, within the current vfiler's CIFS module 580. When a variable is referenced, the appropriate variable is retrieved from the CIFS module of the current vfiler context.

Specifically, invocation of a vfiler context includes all "per vfiler" data structures and associated processes. These processes include processes that determine the current vfiler context based on incoming requests from the network or based on a WAFL message containing the vfiler context ID. Processes created for each instance of a vfiler, such as a CIFS authentication process, also execute in the context of the current vfiler. For example, the CIFS authentication process runs in the context of a vfiler when contacting a domain controller to validate an incoming request. Authentication information (e.g., NIS, DNS) contained in each vfiler context prevents the request from being processed by users from other vfilers.

As another example, assume a vfiler is functioning as a server and is "listening" for a request arriving at a particular server port to thereby establish/allocate a socket connection. The allocated socket has a vfiler context. Assume further that a subsequent incoming request attempts to access a server protocol that is only associated with the filer, e.g., a protocol used to perform back-up operations. An attempt to look up the port number associated with the protocol (using the PCB table) results in a determination that there is no service for that protocol. This is because there is no networking code within the vfiler context that listens on that particular port. Since there is no allocated socket within that vfiler context for the request, the request fails. The sequence for the incoming path translation procedure ends in Step 632.

Figure 7:
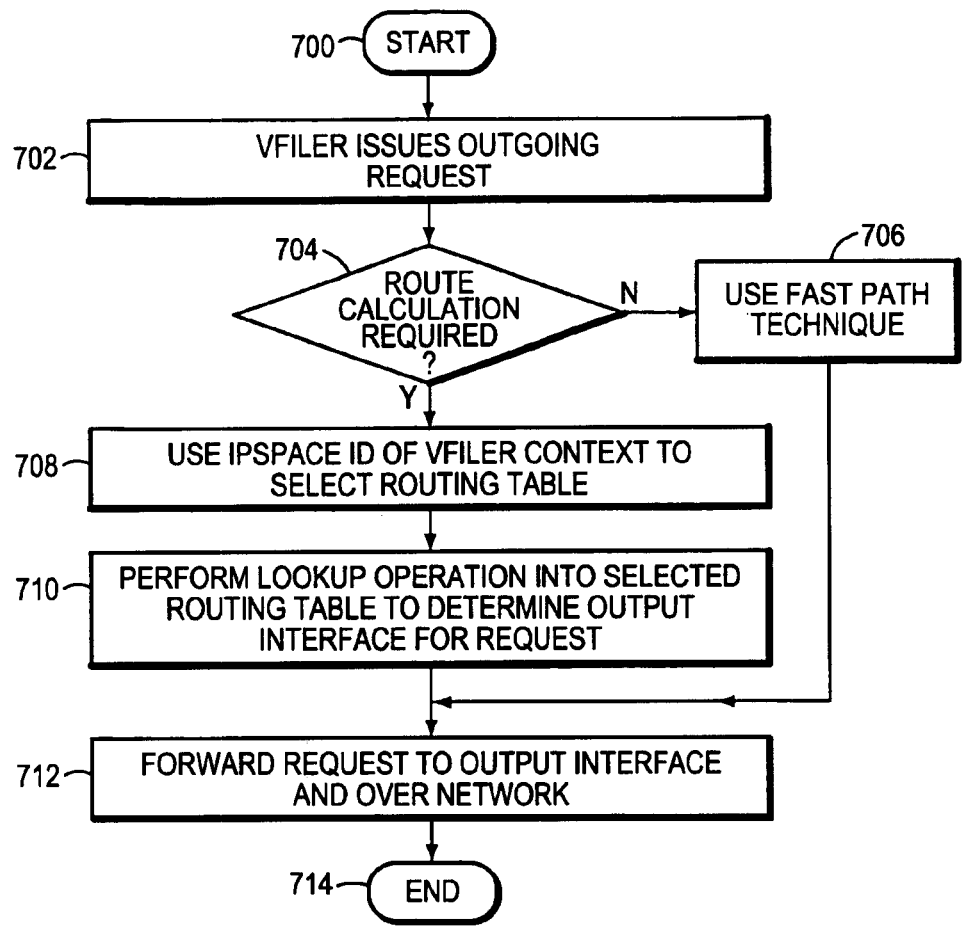
FIG. 7 is a flowchart illustrating the sequence of steps involved with an outgoing path translation procedure in accordance with the present invention.

Outgoing Path:

FIG. 7 is a flowchart illustrating the sequence of steps involved in an outgoing path translation procedure that enables selection of an appropriate routing table 404 for an outgoing request in accordance with the present invention. The sequence starts in Step 700 and proceeds to Step 702 where the vfiler issues an outgoing request. In Step 704 the networking code determines whether the request requires route calculation. If not, in Step 706 the fast path technique described above is invoked to increase performance. However, if a routing operation is required, the IP layer networking code performs a lookup operation to the routing table to determine over which interface the request should be issued. In Step 708, the IPspace ID 572 of the current vfiler context 570 is used to choose the correct routing table. That is, once the current vfiler is selected using the IPspace ID, the routing table pointer 574 of that vfiler context 570 is used to choose the correct routing table 404.

The vfiler then performs a lookup operation into its routing table 404 (in accordance with a forwarding decision) to determine the output interface on the filer (Step 710). As noted, each routing table 404 is assigned to an IPspace; therefore, routing table update packets must be directed to the proper routing table. An IPspace may have multiple routing tables or "routing domains". Yet each vfiler has a routing table, so an IPspace may have multiple vfilers. All routing tables (vfilers) in an IPspace can share interfaces. In Step 712, the request is forwarded to the output interface and over the network. The sequence then ends in Step 714.

Broadcast Packets

When functioning as an SSP, the filer must be capable of advertising its services and issuing broadcast packets. In this case, the data center 400 must ensure a broadcast packet generated in the context of one vfiler is only forwarded over the private intranet of the client associated with that vfiler. In addition, a broadcast packet received over an intranet at the data center must be capable of identifying both the source and destination of that packet among the various vfilers embodied within the data center. According to the invention, a broadcast packet directed to an IPspace is "broadcasted" to all network interfaces within that IPspace. These broadcast packets are restricted to only systems within the appropriate IPspace.

Specifically, an undirected broadcast packet is forwarded over all interfaces belonging to the IPspace. Here, the vfiler context is set so that the IPspace ID is known. Using that IPspace ID, the list of ifnet data structures 510 is traversed ("walked") searching for matching IPspace IDs. The broadcast packet is then forwarded over (sent out) the interfaces corresponding to those ifnet structures having matching IPspace IDs. For directed broadcasts, on the other hand, the list of ifnet structures is walked searching for matching IP address prefixes; the replicated broadcast packets are then sent over only those matching interfaces.

As noted, each interface of the SSP data center is assigned to an IPspace. The problem with the use of one interface per IPspace is the restriction that the vfiler architecture is limited to as many different private client networks as there are physical interfaces on the filer. This limitation can be obviated with the use of VLAN tagging. VLAN tagging may be used at the data center to separate traffic to and from different client networks.

For example and referring to FIGS. 1 and 4, the dedicated network path 426 may be configured to connect from within the client's RFC 1918 compliant intranet 420 to a VLAN-aware shared L2 switch (similar to switch 150) coupled to the data center 400. The VLAN-aware shared L2 switch forwards traffic carried over different client paths onto different VLANs and sends that traffic over one or more shared links (such as links 180) to the filer as VLAN-tagged packets. This traffic arrives at the filer/data center via, e.g., a single physical interface 408.

A VLAN driver of layer 310 de-multiplexes the data traffic packets and directs them to different software interfaces (ifnet structures 510) based on VLAN IDs tagged with the packets. These software interfaces ("VLAN pseudo-interfaces") may belong to different IPspaces. The pseudo-interfaces corresponding to the different VLANs (and corresponding to the different client networks) have IP addresses that may be assigned to different IPspaces. When higher-layer software of a vfiler generates data traffic packets, those packets are "tagged" with appropriate VLAN IDs and thereafter restricted by the L2 switch to only those destinations on a VLAN identified by the VLAN ID.

In some cases, it may be desirable for the vfiler to send packets over a default route that is not specified by the routing table. A characteristic of a routing table is a default route corresponding to one of the interfaces of the filer. Typically, all VLAN traffic is forced to share the same default route. However, all VLAN traffic cannot share the same default route, particularly for a SSP implementation, where different clients, and their different private intranets, share the same filer. According to an aspect of the invention, the routing table 404 is modified with a default route corresponding to each VLAN supported by an IPspace. This enables a vfiler to separate IPspace context from the routing domain context and further from the vfiler context.

While there has been shown and described an illustrative embodiment for allowing a filer configured with multiple vfilers to participate in multiple private network address spaces having potentially overlapping network addresses, it is to be understood that various other adaptations and modifications may be made within the spirit and scope of the invention. For example in an alternate embodiment of the present invention, it is possible for a vfiler to "filter" a correctly received request at an IP address of the filer based on the source IP address of the request. Here, source IP address checking is performed at, e.g., the NIS or DNS domain level of the filer. Therefore, although the destination IP address of a request is used to select an appropriate vfiler, that vfiler will only accept (process) the request if it has appropriate rights or permission.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling a server configured with a plurality of virtual servers to participate in a plurality of private network address spaces and service requests within those address spaces, the method comprising the steps of:

associating each virtual server with an IPspace having one or more addresses assigned to one or more network interfaces of the virtual server;

tagging each network interface with a first IPspace identifier (ID);

providing the virtual server with one or more routing tables that control routing operations for requests processed by the virtual server; and applying the first IPspace ID to translation procedures that enable selection of a current virtual server context used to process an incoming request and an appropriate routing table used to process an outgoing request.

2. The method of claim 1 wherein the server is a filer and wherein the virtual server is a virtual filer (vfiler).

3. The method of claim 2 wherein the step of applying comprises the step of employing an incoming path translation procedure.

4. The method of claim 3 wherein the step of employing comprises the steps of:

receiving the incoming request at the network interface, the incoming request having a destination address;

searching a list of addresses contained in an interface network structure for an address that matches the destination address of the incoming request, the interface network structure storing the first IPspace ID; and upon finding a match, following a first pointer of the interface network structure to an interface address structure having a back link pointer that references a vfiler context structure storing a second IPspace ID.

5. The method of claim 4 wherein the step of employing further comprises the steps of:

comparing the first IPspace ID with the second IPspace ID; and selecting the current vfiler context to process the incoming request when the first IPspace ID matches the second IPspace ID.

6. The method of claim 3 wherein the step of applying comprises the step of employing an outgoing path translation procedure.

7. The method of claim 6 wherein the step of employing comprises the steps of:

issuing the outgoing request from a vfiler;

determining whether the request requires route calculation; and if route calculation is required, using a routing table pointer of the current vfiler context to choose the appropriate routing table of the vfiler to process the outgoing request.

8. The method of claim 7 wherein the step of choosing comprises the steps of:

performing a lookup operation to the appropriate routing table;

determining over which output interface the outgoing request should be forwarded; and forwarding the request to the output interface.

9. A method for enabling a filer configured with a plurality of virtual filers to participate in a plurality of private network address spaces and service requests within those address spaces the method comprising the steps of:

associating each virtual filer with an IPspace having one or more addresses assigned to one or more network interfaces of the virtual filer;

tagging each network interface with a first IPspace identifier (ID);

providing the virtual filer with one or more routing tables that control routing operations for requests processed by the virtual filer;

receiving the incoming request at the network interface, the incoming request having a destination address;

searching a list of addresses contained in an interface network structure for an address that matches the destination address of the incoming request, the interface network structure storing the first IPspace ID;

configuring a second pointer of a process block data structure to reference the current vfiler context to thereby qualify the request for subsequent processing in the filer;

comparing the first IPspace ID with the second IPspace ID;

upon finding a match, following a first pointer of the interface network structure to an interface address structure having a back link pointer that references a vfiler context structure storing a second IPspace ID; and selecting the current vfiler context to process the incoming request when the first IPspace ID matches the second IPspace ID.

10. The method of claim 9 wherein the subsequent processing comprises one of searches and boundary checks needed to verify that the vfiler is allowed to access requested storage resources.

11. A system adapted to enable a file server configured with a plurality of virtual servers to participate in a plurality of private network address spaces and service requests within those address spaces, the system comprising:

a network adapter including at least one network interface configured to receive an incoming request from the network and to forward an outgoing request over the network, the network interface an address and having a first IPspace identifier (ID) that binds the interface to an IPspace;

a plurality of routing tables maintained by the virtual servers to control routing operations for requests processed by the virtual servers;

an operating system comprising networking code that uses a destination address of the incoming request and the first IPspace ID to select a current virtual server to process the incoming request, the networking code further using a routing table pointer of the current virtual server to select an appropriate routing table if a routing operation is required for the outgoing request; and a processor coupled to the network adapter and configured to execute the operating system to thereby invoke network and storage access operations in accordance with translation procedures associated with incoming and outgoing requests.

12. The system of claim 11 wherein the file server is a filer and wherein the virtual servers are virtual filers (vfilers).

13. The system of claim 12 wherein the operating system is a storage operating system.

14. The system of claim 13 further comprising a memory adapted to maintain various data structures that cooperate to provide an IPspace database that stores configuration information used to select the current vfiler.

15. A system adapted to enable a file server configured with a plurality of virtual filers to participate in a plurality of private network address spaces and service requests within those address spaces, the system comprising:

a network adapter including at least one network interface configured to receive an incoming request from the network and to forward an outgoing request over the network, the network interface an address and having a first IPspace identifier (ID) that binds the interface to an IPspace;

a plurality of routing tables maintained by the virtual filers to control routing operations for requests processed by the virtual filers;

a storage operating system comprising networking code that uses a destination address of the incoming request and the first IPspace ID to select a current virtual filer to process the incoming request, the networking code further using a routing table pointer of the current virtual server to select an appropriate routing table if a routing operation is required for the outgoing request;

a memory adapted to maintain various data structures that cooperate to provide an IPspace database that stores configuration information used to select the current vfiler, where the various data structures comprise:

an interface network (ifnet) structure associated with the network interface, an interface address (ifaddr) structure coupled to the ifnet structure and representing the address of the interface, a vfiler context structure coupled to die ifaddr structure, and a process block (proc) structure coupled to the vfiler context structure; and a processor coupled to the network adapter and configured to execute the operating system to thereby invoke network and storage access operations in accordance with translation procedures associated with incoming and outgoing requests.

16. The system of claim 15 wherein the ifnet structure includes configuration information such as a first pointer referencing the ifaddr structure for the address assigned to the network interface and the first IPspace ID of the interface.

17. The system of claim 16 wherein the ifaddr data structure includes a back link pointer that references the vfiler context structure associated with the address.

18. The system of claim 17 wherein the vfiler context structure contains configuration information needed to establish the current vfiler, the configuration information including a second IPspace ID and the routing table pointer.

19. The system of claim 18 wherein the proc data structure represents a context of a process thread executing on the filer and contains a second pointer referencing the current vfiler.

20. Apparatus for enabling a filer configured with a plurality of virtual filers (vfilers) to participate in a plurality of private network address spaces and service requests within those address spaces, the apparatus comprising:

means for associating each vfiler with an IPspace having one or more addresses assigned to one or more network interfaces of the vfiler;

means for tagging each network interface with a first IPspace identifier (ID);

means for providing the vfiler with one or more routing tables that control routing operations for requests processed by the vfiler; and means for applying the first IPspace ID to translation procedures that enable selection of a current vfiler context used to process an incoming request and an appropriate routing table used to process an outgoing request.

21. A computer readable medium containing executable program instructions for enabling a filer configured with a plurality of virtual filers (vfilers) to participate in a plurality of private network address spaces and service requests within those address spaces, the executable program instructions comprising program instructions for:

associating each vfiler with an IPspace having one or more addresses assigned to one or more network interfaces of the vfiler;

tagging each network interface with a first IPspace identifier (ID);

providing the vfiler with one or more routing tables that control routing operations for requests processed by the vfiler; and applying the first IPspace ID to translation procedures that enable selection of a current vfiler context used to process an incoming request and an appropriate routing table used to process an outgoing request.

22. Electromagnetic signals propagating on a computer network, comprising:

said electromagnetic signals carrying instructions for execution on a processor for the practice of, associating each vfiler with an IPspace having one or more addresses assigned to one or more network interfaces of the vfiler;

tagging each network interface with a first IPspace identifier (ID);

providing the vfiler with one or more routing tables that control routing operations for requests processed by the vfiler; and applying the first IPspace ID to translation procedures that enable selection of a current vfiler context used to process an incoming request and an appropriate routing table used to process an outgoing request.

23. A method for operating a server comprising:

configuring the server as a plurality of virtual servers, a virtual server of said plurality of virtual servers being an instance of the server;

associating each virtual server with a network address space, where different address spaces have overlapping addresses, each address space is associated with at least one network interface of the virtual server;

tagging each network interface with a first interface identifier (ID); and applying the first interface ID to uniquely identify a client in the network address space requesting access to a virtual server of said plurality of virtual servers.

24. The method of claim 23, further comprising:

using a second interface ID to uniquely identify a context of the virtual server requested by the client, where the context is used to distinguish one virtual server from another virtual server.

25. The method of claim 23, further comprising:

receiving a request at a receiving interface of the server; and locating the virtual server in response to a the request and the first interface ID of the receiving interface.

26. The method of claim 25, further comprising:

using a second interface ID to uniquely identify a context of the virtual server requested by the client, where the context is used to distinguish one virtual server from another virtual server.

27. The method of claim 26, further comprising:

determining a short cut for subsequent accesses and responses, in response to the first interface ID and the second interface ID.

28. The method of claim 23, further comprising:

the address space is an IPspace.

29. The method of claim 23, further comprising:

the interface ID is an IPspace ID.

30. An apparatus for operating a server comprising:

the server configured as a plurality of virtual servers, a virtual server of said plurality of virtual servers being an instance of the server;

a network address space associated with each virtual server, where different address spaces have overlapping addresses, each address space is associated with at least one network interface of the virtual server;

a first interface identifier (ID) tagged to each network interface; and an operating system that uses the first interface ID to uniquely identify a client in the network address space requesting access to a virtual server of said plurality of virtual servers.

31. The apparatus of claim 30, further comprising:

a second interface ID to uniquely identify a context of the virtual server requested by the client, where the context is used to distinguish one virtual server from another virtual server.

32. The apparatus of claim 30, further comprising:

a receiving interface of the server to receive a request; and a processor for locating the virtual server in response to a the request and the first interface ID of the receiving interface.

33. The apparatus of claim 32, further comprising:

a second interface ID to uniquely identify a context of the virtual server requested by the client, where the context is used to distinguish one virtual server from another virtual server.

34. The apparatus of claim 33, further comprising:

the processor configured to execute the operating system to thereby determine a short cut for subsequent accesses and responses, in response to the first interface ID and the second interface ID.

35. The method of claim 30, further comprising:

the address space is an IPspace.

36. The method of claim 30, further comprising:

the interface ID is an IPspace ID.

37. An apparatus for operating a server comprising:

means for configuring the server as a plurality of virtual servers, a virtual server of said plurality of virtual servers being an instance of the server;

means for associating each virtual server with a network address space, where different address spaces have overlapping addresses, each address space is associated with at least one network interface of the virtual server;

means for tagging each network interface with a first interface identifier (ID); and a means for applying the first interface ID to uniquely identify a client in the network address space requesting access to a virtual server of said plurality of virtual servers.

38. The apparatus of claim 37, further comprising:

means for using a second interface ID to uniquely identify a context of the virtual server requested by the client, where the context is used to distinguish one virtual server from another virtual server.

39. The apparatus of claim 37, further comprising:

means for receiving a request at a receiving interface of the server; and means for locating the virtual server in response to a the request and the first interface ID of the receiving interface.

40. The apparatus of claim 39, further comprising:

means for using a second interface ID to uniquely identify a context of the virtual server requested by the client, where the context is used to distinguish one virtual server from another virtual server.

41. The apparatus of claim 40, further comprising:

means for determining a short cut for subsequent accesses and responses in response, to the first interface ID and the second interface ID.

42. The method of claim 37, further comprising:

the address space is an IPspace.

43. The method of claim 37, further comprising:

the interface ID is an IPspace ID.

* * * * *